United States Patent Office 2,994,633
Patented Aug. 1, 1961

2,994,633
PROCESS FOR SEPARATING LIGNIN SOLIDS FROM USED NEUTRAL SULFITE PULPING LIQUORS
Charles K. Clark, Crossett, Ark., assignor to The Crossett Company, Crossett, Ark., a company of Arkansas
No Drawing. Filed Aug. 21, 1958, Ser. No. 756,299
11 Claims. (Cl. 162—16)

This invention relates to the separation of lignin materials from used liquors obtained from sulfite processes for the pulping of lignocellulosic materials. More particularly, the invention embraces a method effective to convert, to separable solids, at least some of the lignosulfonic acid materials normally present in used neutral sulfite pulping liquors.

It is known in the prior art to subject used acid sulfite pulping liquors to heat and pressure to effect the precipitation of lignin solids therefrom. In general, such prior art processes entail the addition of free acid to the pulping liquor treated or the generation of such acid in situ therein.

In United States Patent No. 1,149,420 to Strehlenert, a process is described pursuant to which used calcium sulfite pulping liquor is subjected to heat and pressure under conditions effective to oxidize the sulfurous acid present and produce in situ sulfuric acid to dissociate the "lignosulfonites" present and thereby produce a precipitate of lignin materials. The in situ formation of sulfuric acid is said to be essential to the success of the process.

In United States Patent No. 1,351,506, the same inventor describes a modification of the process of Patent No. 1,149,420 which entails the addition of sulfur dioxide to the calcium sulfite waste liquors processed to supplement the sulfurous acid normally present, and thereby increase the amount of sulfuric acid formed in situ. A further improvement is described by the same inventor in United States Patent No. 1,384,219, pursuant to which the process of Patent No. 1,149,420 is applied to a previously concentrated acid sulfite pulping liquor whereby decomposition of both the "ligno-sulfites" and the "ligno-sulfates" present is achieved to provide a relatively large precipitate of lignin solids.

A comparable prior art process is described in the Söraas United States Patent No. 1,297,028, which contemplates the precipitation of lignin solids from used calcium sulfite pulping liquors by the application of heat and pressure in two stages, including a relatively low pressure first stage and a relatively high pressure second stage. Mörch United States Patent No. 1,415,843 is addressed to a method for practicing, on a continuous basis, processes corresponding essentially to those described in the Strehlenert and Söraas references. The Michael United States Patent No. 1,723,800 describes another comparable process applied to a used ammonium base sulfite liquor. The Michael process achieves the same result as the procedures applied to used acid sulfite liquors, even through an excess of ammonia is used. By reason of the weakly basic character of ammonia and because of the escape of $NH_3$ to the vapor phase, the system is actually acidic during the pressure cook.

Each of the prior art reference procedures contemplates a combination of a pressure cook at an elevated temperature, generally from about 200° to about 210° C., in the presence of acid (1) inherently present (2) formed in situ or (3) added to the liquor processed. In some cases, as in United States Patent 1,361,506, acid from a combination of such sources is utilized. None of the prior art procedures is effective to precipitate lignin solids from used pulping liquor having a pH of from about six to about ten, and more specifically from the essentially neutral used pulping liquors which result from conventional neutral sulfite pulping procedures. Moreover, in the period of years which has elapsed since the issuance of the Mörch Patent No. 1,415,843 in 1922 until the present invention, the art has failed to develop any satisfactory method for the precipitation of lignin solids from neutral used pulping liquors. The explanation may perhaps reside in the generally unevaluated variation with pH of the chemistry of the system and particularly of aliphatic sulfonic acid compounds such as the lignosulfonic acids which characterize the pulping liquors contemplated. Sulfonic acid groups bonded to aliphatic compounds do, however, bear sufficient analogy to sulfonic acid groups bonded to aromatic compounds, that similar reaction variations with pH change may reasonably be hypothesized.

It is known that aromatic sulfonic acid compounds, when subjected to heat and pressure at an acid pH tend to replace the —$SO_3H$ radical with —H ion and produce sulfuric acid pursuant to the following generalized equation in which R is any aromatic radical:

(I) 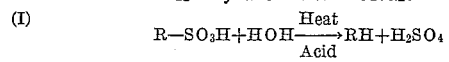
$$\text{R}-\text{SO}_3\text{H} + \text{HOH} \xrightarrow[\text{Acid}]{\text{Heat}} \text{RH} + \text{H}_2\text{SO}_4$$

It is significant that the foregoing reaction yields one mol of dibasic sulfuric acid for each mol of monobasic sulfonic acid. Hence, even if substantially neutralized sulfonic acid is employed as a starting material, there is insufficient base present in the system to neutralize the sulfuric acid produced. It is thus apparent that, under the foregoing hypothesis in procedures, such as those described in Strehlenert Patents 1,149,420; 1,361,506 and 1,384,219; in Söraas Patent No. 1,297,028, and in Mörch Patent No. 1,415,843, there is a deficiency of base to neutralize all of the acidity in the system. Indeed, even in that embodiment of Strehlenert Patent No. 1,149,420 in which the calcium is removed before the application of heat and pressure, such removal is effected with sodium bisulfite or sodium bisulfate whereby the low ratio of base to the acid-forming sulfur present is maintained.

It is apparent, therefore, that the prior art procedures applied to acid sulfite pulping liquors all entailed systems in which there was excess acid, which, as the Strehlenert patents emphasize, was considered essential to effect the desired precipitation of lignin solids.

In used neutral sulfite pulping liquors, to which this invention is primarily directed, there is present a mixture of sodium sulfite and sodium carbonate, and hence, in contrast with used acid pulping liquors, more than an adequate amount of base to neutralize any sulfuric or sulfurous acid formed when such liquors are subjected to heat and pressure. Accordingly, it would be anticipated that prior art procedures which are applicable to precipitate lignin solids from acid sulfite pulping liquors and which depend upon the presence of free acid in the system, would be ineffective to precipitate lignin solids from neutral sulfite pulping liquors.

It is also conventional, in the prior art, to precipitate lignin solids from used alkaline pulping liquors by the application of heat and pressure thereto. A representative prior art procedure is described in Hägglund United States Patent No. 1,795,557, pursuant to which "black liquor" from a soda pulping operation is subjected to a pressure between 150 and 200 atmospheres at a temperature of about 350° C. to effect lignin solids precipitation. It will be appreciated, however, that the lignin materials are not present in used pulping liquors from alkaline pulping processes in the form of sulfonic acids, hence the chemistry incident lignin solids precipitation from such alkaline liquors is non-analogous to that incident the precipitation of lignin materials from used sulfite pulping liquors which entails conversion of the solubilizing sulfonic acid group to a non-solubilizing substituent such that precipitation of lignin solids may occur.

Indeed, by analogy to the chemistry of aromatic sulfonic acid compounds, under alkaline conditions, lignin sulfonic acid salts would be expected to form comparatively soluble lignin compounds in accordance with the following generalized equation in which R is any aromatic radical, and RONa is the salt form of a phenol:

(II) $\quad 2RSO_3Na + 2NaOH \xrightarrow{(XS)} 2RONa + Na_2SO_3 + H_2O$

The addition of base, such as sodium hydroxide to the neutral sulfite liquors with which this invention is concerned, is effective to convert the lignin sulfonic acids to soluble salts, and yields a material from which no substantial quantities of lignin solids are precipitated by a pressure cook so long as the base remains in solution. In such a system, sodium sulfite is formed and the reaction appears to conform to that characteristic of aromatic sulfonic acid compounds under alkaline conditions, as indicated in Equation II, to produce lignin derivatives which are phenolic in character and hence soluble in aqueous sodium hydroxide and analogous basic media.

Neutral sulfite pulping liquors which have been heated to 225° C. or higher, however, contain sodium carbonate, sodium bicarbonate, sodium sulfide, sodium bisulfide and hydrogen sulfide. In some cases, sodium sulfate, sodium sulfite, sodium thiosulfate and free sulfur are also present. It is apparent that the reactions which occur when neutral sulfite pulping liquors are pressure-cooked are complex and unlike those which characterize a similar process under either distinctly acidic or distinctly alkaline conditions. The effective precipitation of lignin solids from neutral sulfite pulping liquors therefore presents a challenging problem for which the art, prior to this invention, found no adequate solution.

It is, accordingly, a primary object of this invention to provide a process for the separation of lignin solids from neutral used sulfite pulping liquors.

It is a more specific object of the invention to provide a process which entails the application of heat and pressure to a neutral used sulfite pulping liquor to effect the precipitation of lignin solids therefrom.

An additional specific object of the invention is to provide an economically attractive, commercially feasible method for the separation of lignin solids materials from used neutral sulfite pulping liquors.

Now, in accordance with this invention, it has been discovered that lignin solids are effectively precipitated from sulfite pulping liquors having a pH of from about six to about ten and a total solids concentration of at least about 20%, and preferably from about 30% to about 55% by weight by subjecting in the substantial absence of free hydrogen said liquors to a temperature of at least about 225° C., and preferably from about 250° C. to about 300° C., under a pressure of at least about 360, and preferably about 700 to about 1800 pounds per square inch for a time period of at least about fifteen, and preferably from about twenty to about thirty minutes. Autogenous pressure at a temperature of at least about 250° C. is appropriate for commercial operation. The lignin solids so precipitated are readily separated from the pressure-cooked liquor by conventional means such as filtration.

The discovery reflected by the present invention is unexpected in light of the prior art knowledge concerning the precipitation of lignin solids from either used acid sulfite pulping liquors or used alkaline pulping liquors. Prior art procedures applicable to acid sulfite pulping liquors depend upon the presence of free acid, whereas, in neutral sulfite pulping liquors, there is always present an amount of base more than adequate to neutralize any free acid, formed in the pressure-cooking operation.

Moreover, since used neutral sulfite pulping liquors contain significant amounts of sodium carbonate which, at temperatures in excess of 200° C., in an aqueous system, hydrolyzes to sodium hydroxide and carbon dioxide which escapes to the vapor phase. Hence it would be anticipated that pressure-cooking of such liquors at temperatures of at least 250° C. would raise the pH of the system and render inoperable any process dependent upon the presence of free acid. Indeed, it would reasonably be expected that sodium carbonate decomposition to produce sodium hydroxide would result in a lignosulfonic acid reaction to heat and pressure as typified by Equation II such that no effective precipitation of lignin solids would occur. Such, however, is not the case, and the process of the invention comprises a feasible procedure for the removal of lignin solids from used neutral sulfite pulping liquors.

The invention contemplates, as starting materials, all used sulfite pulping liquors having a pH of from about six to about 9.5. Used liquors from neutral sulfite pulping operations, which are normally characterized by a pH of about nine to about 9.5, are preferred. Liquors from acid sulfite pulping operations can be employed if the pH is adjusted to the specified range of about six to about ten. Preferably, such pH adjustment is effected by the addition to the used acid sulfite liquor of one or both of sodium carbonate, sodium sulfite, or mixtures thereof, the reagents utilized in neutral sulfite pulping. Otherwise stated, neutral sulfite liquors having an $$Na_2O:SO_3H$$

ratio of at least about 1:1 are preferred.

The invention is generally useful to precipitate lignin solids from used neutral sulfite pulping liquors containing at least about twenty percent by weight total solids. The quantity of lignin solids precipitated is, at least to some extent, a function of the relative proportion of total solids present in the liquor subjected to pressure-cooking pursuant to the invention. More specifically, the quantity of lignin solids precipitated from neutral sulfite pulping liquors by the method of the invention increases as the total solids content of the treated liquor increases, up to the preferred range of about 30 to about 55 weight percent. Concentration to more than 55 weight percent total solids effects no significant further increase in the quantity of lignin solids precipitated and may result in liquors which are disadvantageously high in viscosity either before or after the pressure cook, or both.

The process of the invention can be practiced in any desired form of apparatus appropriate to provide the requisite temperature and pressure conditions. Preferably, there is utilized a closed vessel, such as an autoclave, in which autogenous pressure is effectively developed at the specified temperature conditions. There is no upper limit on the temperature and pressure contemplated save that imposed by the physical limitations of the apparatus and the stability of the liquor undergoing treatment.

The ensuing examples are illustrative of the best mode presently known for the practice of the invention.

EXAMPLE I

Used liquor from a conventional neutral sulfite pulping operation, characterized by a pH of about nine, was concentrated by the evaporation of water to a solids content of about 39.3 weight percent.

About eight hundred grams of the concentrated liquor were placed in an autoclave and raised to a maximum temperature of 277° C. over a period of about thirty minutes, under autogenous pressure which reached a maximum of 1200 p.s.i.g. The autoclaved liquor, upon cooling, deposited a fine precipitate of black lignin solids which were removed by filtration to provide a filter cake weighing 123 grams on a dry basis and representing 38.9% of the solids present in the liquor charged to the reaction. The resulting filtrate was a clear amber color in contrast to the generally opaque black color of the original liquor.

EXAMPLE II

Used liquor from a conventional neutral sulfite pulping operation having a pH of 9.3 was concentrated by evaporation to a total solids content of about 39.5 weight percent.

About eight hundred grams of the concentrated liquor, which contained 7.8 weight percent of sodium calculated as $Na_2O$ and 6.6 weight percent of sulfur calculated as $SO_2$, were charged to an autoclave and raised to and maintained at a maximum temperature of 275° C. to 280° C. for about thirty-three minutes under autogenous pressure which reached a maximum of 1400 p.s.i.g. The autoclaved liquor, when cooled, deposited a precipitate of lignin solids which, on a weight basis, contained 41% of the solids present in the liquor treated and was characterized by a pH of 7.5.

EXAMPLE III

The variation in the quantity of lignin solids precipitated with the total solids content of the used neutral sulfite pulping liquor processed pursuant to the invention is reflected by a series of comparative tests.

A quantity of used liquor from a neutral sulfite pulping operation having a pH of about nine was divided into five portions which were concentrated by evaporation to a total solids content of 19.1, 30, 39.5, 45, and 50.0 weight percent, respectively.

Equal, approximately 800, gram portions of each sample were charged to an autoclave and raised, under autogenous pressure of about 1200 p.s.i.g., to a temperature of 275° C. to 285° C., which was maintained for thirty-five minutes. The autoclaved charges were then cooled to room temperature, the autoclaves were vented, the charges removed and filtered with gentle suction, and the precipitates pressed as dry as possible. The filter cakes were then air dried, ground to a powder, and the solids content thereof determined. The filtrates were weighed, and the solids content thereof was likewise determined. A sample of each of the filter cakes was leached with hot one normal hydrochloric acid and washed with distilled water slightly acidified (about 0.01 N) with hydrochloric acid. The oven dry weight of the extracted residual filter cake was determined, as well as the $Na_2O$ content of the acid leach.

Comparative data reflecting the results is reported in Table I:

*Table I*

| | Test No. | | | | |
|---|---|---|---|---|---|
| | 1 | 2 | 3 | 4 | 5 |
| Solids during cook, Wt. Percent of charge | 19.1 | 30.0 | 39.5 | 45.0 | 50.0 |
| Solids in cake, Wt. Percent of total solids | 22.3 | 29.5 | 41.0 | 40.8 | 49.3 |
| Solids in filtrate, Wt. Percent of total solids | 56.4 | 43.2 | 35.2 | 31.6 | 24.4 |
| Soda in cake, Wt. Percent of total $Na_2O$ | 9.3 | 16.3 | 32.7 | 41.6 | 44.9 |
| Soda in filtrate, Wt. Percent of total $Na_2O$ | 90.7 | 83.7 | 67.3 | 58.4 | 55.1 |
| Acid insoluble cake, Wt. Percent of total solids | 18.7 | 23.2 | 24.3 | 24.1 | 24.8 |
| Color of filtrate | very dark | dark | amber | amber | amber |

The filtered liquor from the cooks at 39.5%, 45% and 50% solids was a light amber color as contrasted with the black of the uncooked liquor. On acidification the filtered liquor deposited ligneous matter equivalent to only 0.03 to 0.05% of the original solids. The filtered liquor from the cooks at 19.1% and 30% solids was darker in color and, when acidified, precipitated ligneous matter equivalent to 0.2% of the original solids.

It is apparent from Table I that the process of the invention is effective to precipitate lignin solids from used neutral sulfite pulping liquors of widely varying concentration, and that the quantity of lignin solids so precipitated is a function of the total solids content of the liquor charged to the reaction.

I claim:

1. The process which comprises concentrating used liquor from a neutral sulfite process for pulping cellulosic materials to a total solids content of from about 30 to about 55 weight percent, subjecting in the substantial absence of free hydrogen the concentrated liquor to a temperature of from about 250° C. to about 300° C. and a pressure of from about 700 to about 1800 pounds per square inch for a time period of from about twenty to about thirty minutes, cooling the heated liquor, and separating solid lignin materials from the resulting amber liquid.

2. The process of claim 1 wherein said concentrated liquor is heated in a closed system under autogenous pressure.

3. The process of claim 2 wherein said concentrated liquor is heated to a temperature of from about 275° C. to about 280° C.

4. The process which comprises concentrating used liquor from a neutral sulfite process for pulping cellulosic materials to a total solids content of from about 30 to about 55 weight percent subjecting, in the substantial absence of free hydrogen, the concentrated liquor to a temperature of from about 250° C. to about 300° C. and a pressure of from about 700 to about 1000 pounds per square inch for a time period of from about twenty to about thirty minutes, cooling the heated liquid and separating solid lignin materials from the resulting amber liquid, the ratio of $Na_2O$ to $SO_3H$ in said used liquor being about 1:1.

5. The process which comprises subjecting, in the substantial absence of free hydrogen, used sulfite pulping liquors having a pH of from about 6 to about 10 and a total solids concentration of at least 20%, to a temperature of from about 225° C. to about 300° C. and a pressure of at least about 360 pounds per square inch for a period of at least about 15 minutes to form solid lignin materials in an amber liquid, and separating said solid lignin materials from said liquid.

6. The process of claim 5 wherein said liquor has a pH of from about 9 to about 9.5.

7. The process of claim 5 wherein said liquor is used liquor from a neutral sulfite process for pulping cellulosic materials.

8. The process of claim 5 wherein said liquor is concentrated to a total solids content of from about 30 to about 55% by weight prior to subjection to heat and pressure.

9. The process of claim 8 wherein said liquor is subjected to a pressure of from about 700 to about 1800 pounds per square inch.

10. The process which comprises subjecting, in the substantial absence of free hydrogen, used liquor from a neutral sulfite process for pulping cellulosic materials which contains a total solids content of at least about 20%, in a closed system, to a temperature of from about 250° C. to about 300° C. and autogenous pressure of at least about 360 pounds per square inch for a time period of at least about 15 minutes, to form solid lignin materials in an amber liquid, and separating said solid lignin materials from said liquid.

11. The process of claim 10 wherein said liquor is concentrated to a total solids content of from about 30% to about 55% by weight prior to subjection to heat and pressure.

References Cited in the file of this patent

UNITED STATES PATENTS

| 1,297,028 | Soraas | Mar. 11, 1919 |
| 1,298,477 | Drewsen | Mar. 25, 1919 |
| 1,415,843 | Morch | May 9, 1922 |
| 1,795,557 | Hagglund | Mar. 10, 1931 |

FOREIGN PATENTS

| 19,116 | Great Britain | June 16, 1910 |
| 130,377 | Australia | Nov. 30, 1948 |
| 728,563 | Great Britain | Apr. 20, 1955 |